Figure 3:
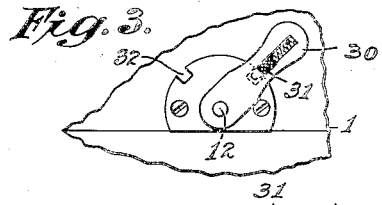

G. R. STRINGHAM.
MOTION PICTURE CAMERA.
APPLICATION FILED SEPT. 3, 1919.
1,363,822.
Patented Dec. 28, 1920.
3 SHEETS—SHEET 1.
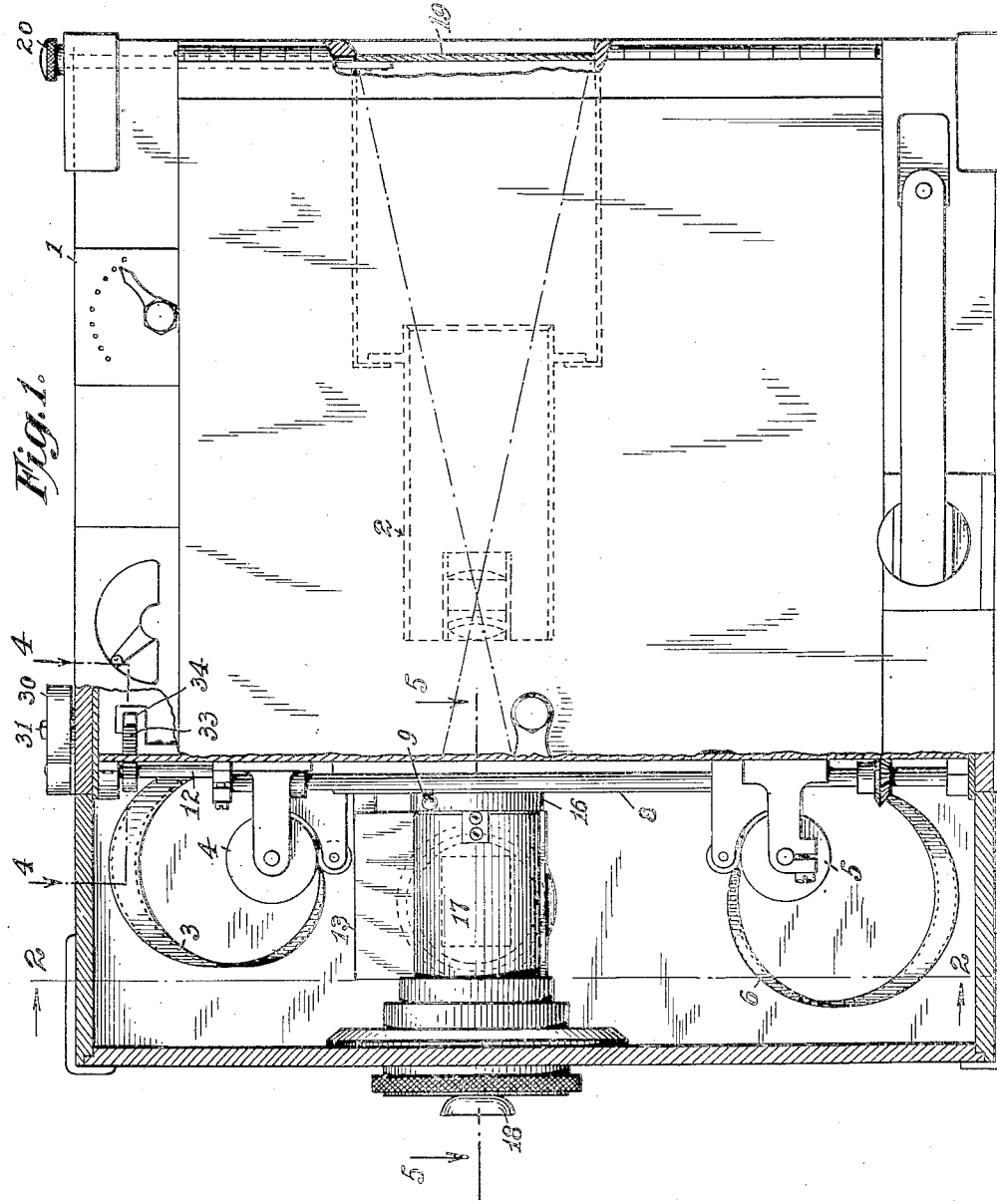
Inventor
George R. Stringham
By his Attorney

G. R. STRINGHAM.
MOTION PICTURE CAMERA.
APPLICATION FILED SEPT. 3, 1919.

1,363,822.

Patented Dec. 28, 1920.

3 SHEETS—SHEET 2.

Inventor
George R. Stringham
By his Attorney

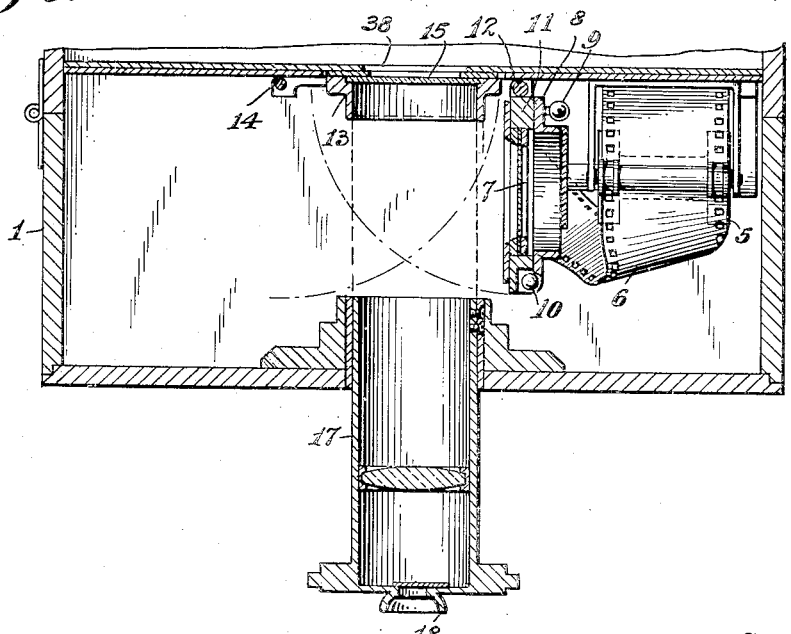

UNITED STATES PATENT OFFICE.

GEORGE R. STRINGHAM, OF NEW YORK, N. Y., ASSIGNOR TO MARTIN V. KELLEY, TRUSTEE, OF NEW YORK, N. Y.

MOTION-PICTURE CAMERA.

1,363,822.   Specification of Letters Patent.   Patented Dec. 28, 1920.

Application filed September 3, 1919. Serial No. 321,318.

*To all whom it may concern:*

Be it known that I, GEORGE R. STRINGHAM, a citizen of the United States, a resident of the borough of Manhattan, city, county, and State of New York, and having a post-office address at No. 3153 Broadway, New York city, have invented certain new and useful Improvements in Motion-Picture Cameras, of which the following is a specification.

My invention relates generally to motion picture cameras and specifically to improvements by which focusing may be facilitated and the operator may be assured that the desired scene is properly located on the film. With motion picture cameras as now made, finders are employed by which the operator can determine in a general way whether the scene being photographed is properly located on the film. This answers the purpose satisfactorily when the objects are some distance off and the field is correspondingly large, but for "close-ups" it is necessary that the projected image shall be very accurately located with respect to the film. For this purpose it is the present practice for the operator to remove the film from the film gate and replace therein a section of ground glass on which the image will be projected, the image being examined by means of an appropriate focusing lens. This operation is not only tedious but is especially objectionable because it results in the section of film between the two retorts becoming light struck each time the operation is performed.

With my improved camera I am able to provide for the accurate adjustment of the image on the film in a fraction of the time now employed for the purpose and without the loss by fogging of any film whatever. To this end my improved camera is provided with the usual film gate which is opened for the "threading" of the film. Instead of being mounted on a stationary part of the camera as is now the practice, it is carried on a pivoted support which is adapted to be swung outwardly, carrying the film gate and film with it. During this movement of the pivoted support for the film gate, the focusing lens is moved longitudinally out of the path of said support. I also employ an auxiliary gate mounted within the camera and which carries a section of ground glass and which is adapted to move into the position formerly occupied by the film, so that the ground glass will occupy the same plane in which the film normally travels. Therefore, any image focused on the ground glass will be properly focused on the film and any image located on the ground glass will be correspondingly located on the film. When this auxiliary gate is thus swung into position the focusing lens is moved inwardly to engage the same with a light-tight joint so that no light can escape into the camera from the objective and no loss of film can occur from that cause. Preferably a vertical sliding shutter is located at the forward end of the camera so as to close the opening to the objective during the operations described, but which is moved upwardly to uncover the objective when the focusing lens has been moved into position adjacent to the ground glass and also during the normal operation of the camera. Preferably the pivoted support for the film gate and the auxiliary gate carrying the ground glass are connected together mechanically so that the movement which swings the support on its pivots outwardly also swings the auxiliary gate into operative position, the reverse movement of the actuating device swinging the auxiliary gate toward its normal position out of line with the axis of the objective and bringing the film gate support again to its normal position.

Figure 2:
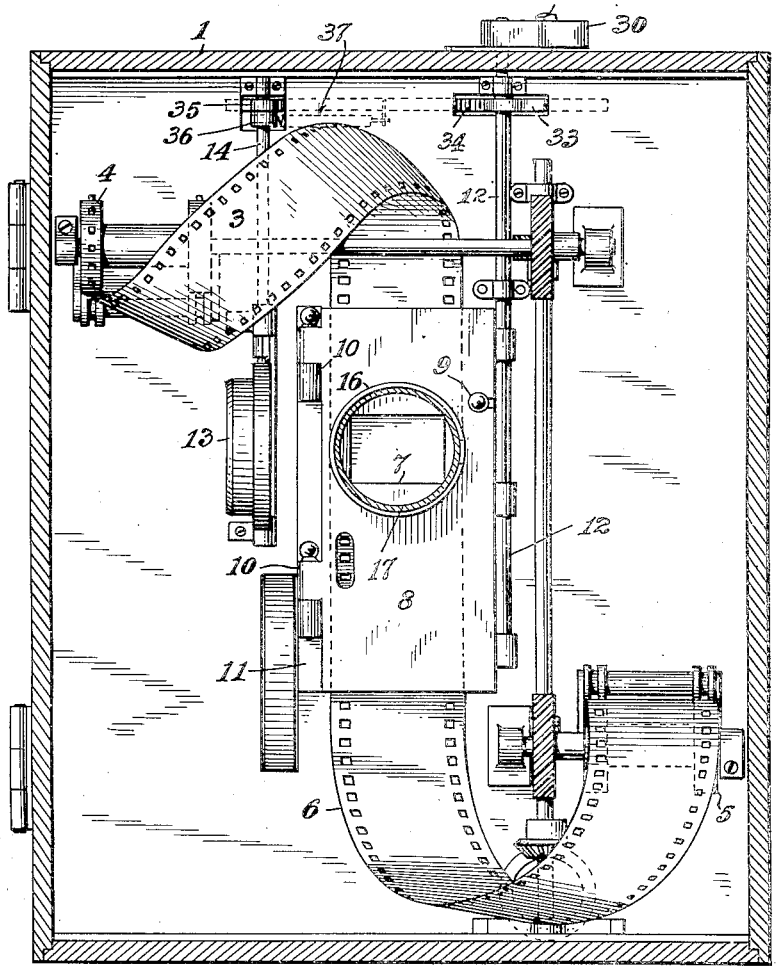

In order that the invention may be better understood, attention is directed to the accompanying drawing, forming part of this specification, and in which Figure 1 is a side elevation of a motion picture camera embodying my present improvements, the rear part of the camera being shown in section, so as to disclose the film and focusing lens and the forward part of the camera being broken away to illustrate the sliding shutter for cutting off the objective when the focusing lens is withdrawn to the position shown in Fig. 6. In Fig. 1 the objective, its supporting tube and the well in which the objective is located are all shown in dotted lines. Fig. 2 is a section on the line 2—2 of Fig. 1, looking in the direction of the arrows. Fig. 3 is a detailed view illustrating a form of catch for locking the actuating lever for the finding and focusing devices in either of its two extreme movements. Fig. 4 is a section on the line 4—4 of Fig. 1, looking in the direction of the arrows, illustrating a convenient form of mechanism for simultaneously operating the film gate support and the auxiliary gate. Fig. 5, a section on the line of 5—5 of Fig. 1 looking in the direction of the arrows and showing the parts in their normal positions, i. e., the film gate support being closed, the auxiliary gate being open and the focusing lens occupying its innermost position. Fig. 6, a view corresponding to Fig. 5, showing the film gate support in its opened position, the auxiliary gate in its closed position and the focusing lens in its outermost position. In all of the above views corresponding parts are represented by the same numerals.

The camera shown in the drawing is of the type illustrated in my application for Letters Patent filed December 12, 1917, Serial No. 206,764 comprising a casing (1) with the objective (2) located entirely within the same and the retorts for the film being located on opposite sides of the objective. The film (3) passes out of one of the retorts over the sprocket (4) and enters the other retort over the sprocket (5) being formed in a loop (6) which passes in front of the opening (7) in the usual film gate (8), such opening corresponding to a single picture as projected on the film from the objective (1). The film is moved intermittently past the objective by any appropriate mechanism, as, for example, the special claw feed disclosed in my application filed December 12, 1917, Serial No. 206,765. The sprockets (4) and (5) operate continuously in the usual way to maintain the loop (6). The film gate (8) is provided with any suitable form of latch (9) to keep it locked during the operation of the camera and is mounted on the hinges (10) so as to be opened in the usual way in the threading of the film. Ordinarily the hinges (10) for the film gate are carried by a permanent part of the camera, but with my improved device these hinges are mounted on a support (11) which is pivoted at the side opposite the hinges (10) on a vertical shaft (12), so that by partly rotating said shaft the film gate support (11) can be moved or swung from the position shown in Fig. 5 to the position shown in Fig. 6, carrying the film gate and film with it. An auxiliary element or gate (13) is pivoted on a shaft (14) and is adapted to be moved from the position shown in Fig. 5 to the position shown in Fig. 6 when said shaft is partly rotated. This auxiliary element or gate is essentially tubular as shown and carries a section of ground glass (15) which when in the position shown in Fig. 6 occupies the same plane as the normal position of the film (Fig. 5). The film gate is provided with a tubular extension (16) corresponding in diameter to the element (13) and located coincidently with the opening (7) as shown and which is adapted to be engaged by the end of the focusing lens (17) having an eye-piece (18). Normally the focusing lens (17) occupies the position shown in Fig. 5 being in contact with the extension (16) of the film gate, but when the film gate support is to be moved, swinging on the arc shown in dotted lines (Fig. 6), the focusing lens (17) is first withdrawn to the outermost position shown in Fig. 6, so as to be out of the path of the film gate support. In this position the auxiliary gate (13) can also be swung along the path shown in dotted lines (Fig. 6) to occupy the position formerly occupied by the film gate support, whereupon the focusing lens (17) is again moved inward, the end thereof engaging the tubular element (13) so as to cut off light from the film and permitting the image on the ground glass (15) to be examined through the eye-piece (18). When the film gate support is swung outwardly to the position shown in Fig. 6, it is important that the objective should be cut off, because otherwise light therefrom would be likely to fog the film. For this purpose I make use of a sliding shutter (19) located at the forward end of the camera in front of the objective and which is adapted to be lifted up under normal operation by a knob (20). Before the film gate support is opened this sliding shutter is closed so as to cut off light to the objective. Also the focusing lens is provided with the usual sliding light trap (not shown) to cut off light through the same when said lens is withdrawn to its outward position. While the film gate support (11) and the auxiliary gate (13) may be operated independently of each other, it is desirable that they should be operated concurrently or at least by the same common element in order to facilitate the operation and to assure the operator that the movements will take place in proper sequence. Suitable mechanism for this purpose is shown in Figs. 1 to 4 inclusive. The shaft (12) on which the film gate support is mounted extends up through the camera and is provided on its upper end with a small lever (30) by which the shaft may be moved through a part of a rotation to swing the film gate support. This lever (30) may be provided with a spring latch (31) adapted to engage notches as shown to lock the support in either its opened or closed position. Mounted on the shaft (12) is a toothed sector (33) with which a rack (34) engages. This rack is adapted to engage a smaller sector (35) mounted on the shaft (14) by which the auxiliary gate (13) is carried. The shaft (14) is shown as being provided with an arm (36) with which a spring (37) connects, so that normally the spring (37) will hold the auxiliary gate (13) in the opened position shown in Fig. 5. More or less lost motion is preferably provided between the teeth of the rack (34) and the sector (35) so that the film gate support is partially opened before the rack teeth engage the sector (35) to quickly close the auxiliary gate (13) and bring it to the position shown in Fig. 6. In this way possible interference between the two swinging elements is avoided.

It will be, of course, understood that the camera is provided with the opening (38) behind the objective, corresponding with the opening (7) in the film gate and by which light from the objective may reach the film during the operation of the camera.

Having now described my invention, what I claim as new therein and desire to secure by Letters Patent is as follows:

1. In a motion picture camera, the combination with the objective and film normally in line therewith, a ground glass movable into and out of line with the objective, means for moving the film out of line with the objective and for successively moving the ground glass into line therewith whereby the image to be photographed will be received on said ground glass, and a focusing tube for observing the image on said ground glass, said focusing tube being movable so that its end will inclose the ground glass, substantially as and for the purpose set forth.

2. In a motion picture camera, the combination with the objective and film, of a film gate through which the film passes, pivoted so as to be swung out of line with the objective, an auxiliary gate carrying a ground glass adapted to be swung into line with the objective and a longitudinally movable focusing lens for observing the image on the ground glass, substantially as set forth.

3. In a motion picture camera, the combination with the objective, film and means for moving the film out of line with the objective, of an auxiliary gate adapted to be moved into line with the objective and a focusing lens for observing the image on the ground glass, substantially as set forth.

4. In a motion picture camera, the combination with a swinging support and a film gate thereon, of a swinging auxiliary gate and a single means for swinging both of said elements in opposite directions, substantially as set forth.

5. In a motion picture camera, the combination with a swinging support and a film gate thereon, of a swinging auxiliary gate and means for concurrently swinging both of said elements, the opening movement of the swinging support preceding the closing movement of the auxiliary gate, substantially as set forth.

This specification signed and witnessed this 28th day of August, 1919.

GEORGE R. STRINGHAM.

Witnesses:
 FRANK L. DYER,
 FRANK W. DYER.